UNITED STATES PATENT OFFICE.

JOHN F. LEDDY, OF HOBOKEN, NEW JERSEY.

PLUMBER'S SOIL.

1,417,258.  Specification of Letters Patent.  Patented May 23, 1922.

No Drawing.  Application filed December 28, 1920. Serial No. 433,668.

*To all whom it may concern:*

Be it known that I, JOHN F. LEDDY, a citizen of the United States, and resident of Hoboken, in the county of Hudson and State of New Jersey, have invented a certain new and useful Plumber's Soil, of which the following is a specification.

This invention relates to an improved plumbers's soil, in paste form, to facilitate the ready application thereof to the pipe sections or other elements to be united by the usual form of wiped joint, and which will, nevertheless, admit of the ready removal of the soil from the portions of the pipes or or other elements which are to receive the solder.

To these ends the invention comprises the following ingredients, to wit: ivory black and chalk to form the body of the compound, which is mixed to a paste-like consistency by the addition of oil of suitable character to produce a pasty mass, such as cylinder oil, molasses and vinegar. In order to eliminate any white spots which would tend to form in the paste, a small quantity of sulphuric acid is added to the mixture, and to prevent the acid from producing a crust-like formation in the applied paste, a small quantity of iron sulphate is added. To increase the adhesiveness of the mixture, gum arabic is added in appropriate quantity. Ordinarily, a sufficient quantity of hot water to dissolve the gum arabic and iron sulphate is employed either before or after these latter ingredients are added to the compound.

I find that a highly effective and relatively inexpensive plumber's soil may be made from the foregoing ingredients in the proportions indicated:

| | |
|---|---|
| Ivory black | 2 lb. |
| Cylinder oil | 4 oz. |
| Molasses | 1 lb. |
| Vinegar | 5 oz. |
| Sulphuric acid | 4 oz. |
| Iron sulphate | 4 dr. |
| Gum arabic | 6 dr. |
| Hot water | 5 oz. |
| Beer | 12 oz. |
| Chalk | 2 oz. |

It will be understood that the proportions of the various ingredients may be varied to suit different conditions and that the composition indicated is merely exemplary. In respect of the chalk, the relatively small proportion indicated is effective in improving the adhesive qualities of the soil, but obviously, the chalk is not an indispensable ingredient, as the soil is found to be satisfactory without any chalk therein.

What I claim as my invention is:

1. A plumber's soil, resulting from the admixture of ivory black, chalk, oil, molasses, vinegar, sulphuric acid, iron sulphate, and gum arabic.

2. A plumber's soil, resulting from the admixture of the following ingredients in substantially the proportions indicated: ivory black, 2lb.; chalk, 2 oz.; cylinder oil, 4 oz.; molasses, 1 lb.; vinegar, 5 oz.; sulphuric acid, 4 oz.; iron sulphate, 4 dr.; gum arabic, 6 dr.; hot water, 5 oz.

3. A plumber's soil, comprising an admixture of ivory black, oil, molasses, vinegar, sulphuric acid, iron sulphate, and gum arabic.

Signed at New York, in the county of New York, and State of New York, this 3rd day of December, A. D. 1920.

JOHN F. LEDDY.